Nov. 1, 1938. E. BUCHER 2,134,855
HOOD FOR BABY CARRIAGES
Filed March 27, 1937
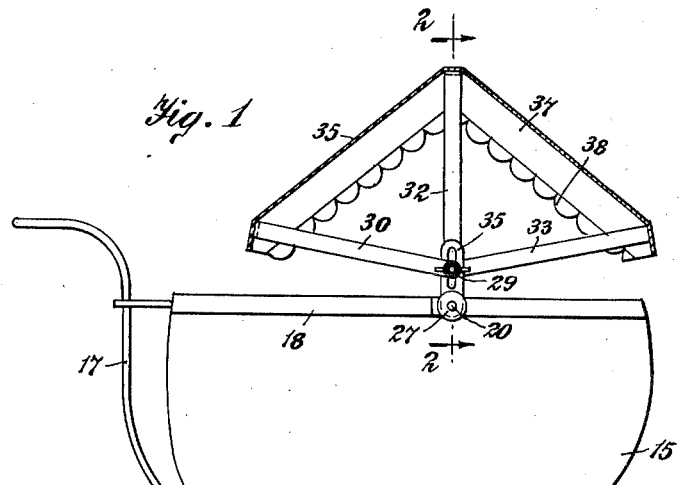
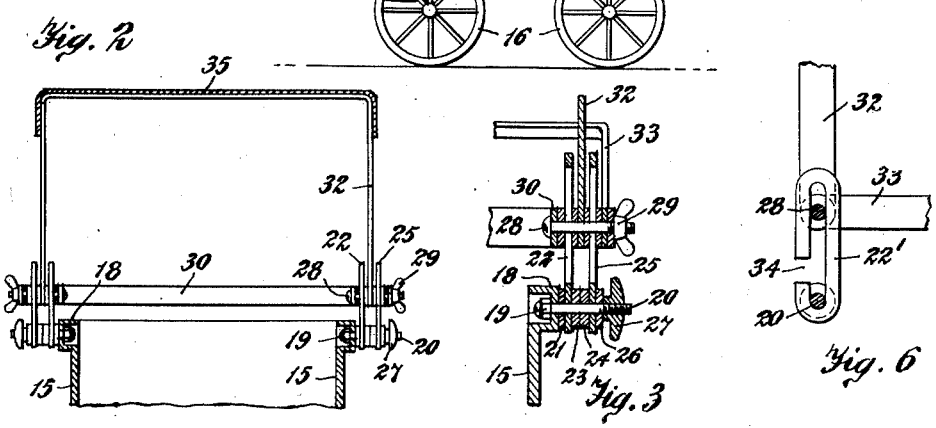
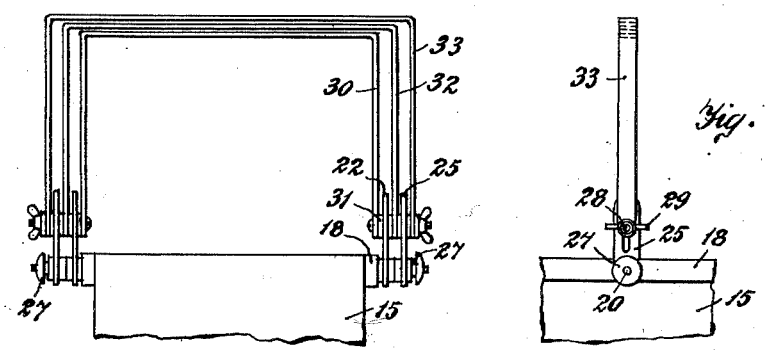
INVENTOR.
EMMY BUCHER
BY
ATTORNEY.

Patented Nov. 1, 1938

2,134,855

UNITED STATES PATENT OFFICE 2,134,855

HOOD FOR BABY CARRIAGES

Emmy Bucher, New York, N. Y.

Application March 27, 1937, Serial No. 133,308

1 Claim. (Cl. 296—110)

This invention relates to improvements in baby carriages, by which term is included, coaches, perambulators, strollers, etc., and has for its object to provide a canopy or hood for such vehicles of ornamental and attractive appearance.

A further feature is in the provision of a canopy that can be extended to cover over the entire upper surface of the vehicle body or to fold compactly and inconspicuously when not required, or to cover such portion of the body as may be desired.

Another purpose is to produce a canopy composed of a flexible fabric, sun and rainproof, and of any preferred color, its edges fringe-finished.

It is well known that direct sun rays are detrimental to children's eyes and, on the other hand, to expose a child to wetting from showers is dangerous to their health.

Having these matters in mind it is the main object of the invention to provide an efficient, adjustable canopy to prevent such untoward happenings.

These objects are accomplished by the novel and practical construction and arrangement of parts hereinafter described and illustrated in the accompanying drawing, constituting an essential component of this disclosure, and in which—

Figure 1 is a side elevational view of a conventional baby carriage showing an embodiment of the invention as attached thereto.

Figure 2 is a partial transverse sectional view taken on line 2—2 of Fig. 2.

Figure 3 is an enlarged fragmentary sectional view showing the canopy frame clamp means.

Figure 4 is a view, similar to Fig. 2 but showing the canopy frames in folded position.

Figure 5 is a side view of the same.

Figure 6 is a side view showing a modified form of a frame connecting link.

Referring in greater detail to the drawing, the numeral 15 designates in general a conventional type of baby carriage, mounted on wheels 16 and provided with the usual curved handle bar supports 17.

The upper edge of the body 15 has an outstanding band 18 of channel shaped cross section, having set therein, substantially central of its length, at the side, the head 19 of a bolt 20, this bolt having pivotally mounted on it a washer 21, slotted link 22, a pair of washers 23—24, a second slotted link 25 and an outer washer 26, all of which can be clamped in adjustment of a hand nut 27, the opposite side being similar.

Another bolt 28 passes through the slots in the links 22—23 and is furnished with a winged clamp nut 29, by which is secured a normally forwardly projecting frame bar 30, a washer 31, an upright bar 32 and an outer bar 33, all these frame bars being bent into a conventional U shape, their opposed elements being similarly secured on the opposite side of the vehicle.

From the foregoing it will be seen that the several frame bars may be turned into any desired position on the bolts 28 and clamped fixedly when so adjusted, whether extended above the vehicle or disposed one over the other in collapsed position.

In the modification shown in Fig. 6, the slotted links 22'—25' are open at one side, as at 34 for convenience in assembling or removing the hood from the vehicle.

In all cases the raised portion of the U shaped frame bars is covered with a fabric canopy 35, which extends downwardly at its edges, as at 37, and provided with an ornamental fringe 33 forming a pleasing appearance.

Although the foregoing is generally descriptive of the best known embodiment of the invention, changes may be made therein as may fall within the spirit and scope of the appended claim.

Having thus described the invention, what is claimed as new and sought to be secured by Letters Patent, is:

In a baby carriage, pairs of spaced links pivotally connected to the upper edges of the carriage body on each side thereof, said links slotted and having lateral openings in one side, a plurality of U shaped unitary frame bars secured in the slots of said links, means for adjusting said bars individually to extend at different relative angles, clamp means to retain said bars in adjusted position, and a canopy attached to said bars.

EMMY BUCHER.